US006470345B1

(12) United States Patent
Doutre et al.

(10) Patent No.: US 6,470,345 B1
(45) Date of Patent: Oct. 22, 2002

(54) REPLACEMENT OF SUBSTRINGS IN FILE/DIRECTORY PATHNAMES WITH NUMERIC TOKENS

(75) Inventors: Edward Doutre, Cary; John Christian Fluke, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,771

(22) Filed: Jan. 4, 2000

(51) Int. Cl.[7] .................................... G06F 17/30
(52) U.S. Cl. ..................... 707/100; 707/102; 707/200; 707/501.1
(58) Field of Search ..................... 707/3–5, 100–102, 707/501.1, 1, 9, 10, 104.1; 709/219, 220, 102, 106, 201, 223, 224; 713/2; 704/9; 706/45, 49, 58; 710/36; 717/113, 121

(56) References Cited

U.S. PATENT DOCUMENTS 5,325,091 A 6/1994 Kaplan et al. ................ 341/51
5,325,531 A * 6/1994 McKeeman et al. ......... 717/112
5,475,743 A * 12/1995 Nixon et al. ........... 379/114.15
5,497,492 A * 3/1996 Zbikowski et al. .......... 709/321
5,525,982 A 6/1996 Cheng et al. ................. 341/51
5,574,903 A * 11/1996 Szymanski et al. ............ 707/1
5,577,249 A 11/1996 Califano ..................... 707/100
5,608,901 A * 3/1997 Letwin ........................ 707/205
5,652,876 A * 7/1997 Ashe et al. .................... 703/26
5,659,755 A 8/1997 Strohacker .................. 708/203
5,666,114 A 9/1997 Brodie et al. ................. 341/50
5,740,353 A * 4/1998 Kreulen et al. ............... 714/33
5,778,255 A 7/1998 Clark et al. .................... 710/68
5,778,361 A * 7/1998 Nanjo et al. .................... 707/2
5,873,118 A * 2/1999 Letwin ........................ 707/205
6,021,433 A * 2/2000 Payne et al. ............... 340/7.29
6,105,027 A * 8/2000 Schneider et al. ............ 707/10
6,185,575 B1 * 2/2001 Orcutt ........................ 707/200
6,195,689 B1 * 2/2001 Bahlmann ................... 709/217
6,199,068 B1 * 3/2001 Carpenter .............. 340/870.03
6,266,678 B1 * 7/2001 McDevitt et al. ............. 707/10
6,366,988 B1 * 4/2002 Skiba et al. ................ 707/203
6,374,250 B2 * 4/2002 Ajtai et al. .................... 341/50

OTHER PUBLICATIONS

"Separation of file/directory pathname canonicalization from validation", Research Disclosure, IBM Corporation, Nov. 1999, p. 1.*
Peterson, Larry "The Profile Naming Service", ACM Transactions on Computer Systems, vol. 6, No. 4, Nov. 1988, pp. 341–364.*
Santry, Douglas J. et al., "Elephant: The File System that Never Forgets", Proceedings of Seventh Workshop on Hot Topics in Operating Systems, Mar. 29–30, 1999, pp. 2–7.*
Bach, M.J., "Design of the Unix Operating System," pp. 76–88, Prentice–Hall, Inc., 1986.

(List continued on next page.)

*Primary Examiner*—Jean M. Corrielus
*Assistant Examiner*—Shahid Alam
(74) *Attorney, Agent, or Firm*—J. Bruce Schelkopf

(57) ABSTRACT

A method and system for replacing substrings in file and directory pathnames with numeric tokens. A name string to be converted is first read; the current working directory and name string are canonicalized to form a pathname containing the substrings. The pathname is parsed and each substring is searched in a string dictionary to locate a corresponding numeric token. The string dictionary that is created associates token values with substrings, so that there is a one-to-one correspondence. The returned list of tokens for the parsed pathname are validated through a lookup process in a directory table. If the parsed pathname is successfully validated, the tokens are then used in subsequent file operations such as create, delete, open, rename and compare files.

48 Claims, 7 Drawing Sheets

20

22 24 26 28 30 32

| # | parent | next | xxyy_child | | flags | name | | |
|---|---|---|---|---|---|---|---|---|
| 0 | #entries | Freelist | z | | dir | null | ... | ... |
| ... | ... | ... | ... | | ... | ... | ... | ... |
| z | 0 | ... | z+1 | | dir | n+3 | ... | ... |
| z+1 | z | ... | z+2 | | dir | n | ... | ... |
| z+2 | z+1 | 0 | xx | yy | file | n+1 | ... | ... |
| ... | ... | ... | ... | | ... | ... | ... | ... |

OTHER PUBLICATIONS

"Complexity of Preprocessor in MPM Data Compression System," Kiefer et al., Proceedings DCC '98 Data Compression Conference, Mar. 30–Apr. 1 1998, p. 554 (abstract only).

"An LR Substring Parser Applied in a Parallel Environment," Clarke, G, et al., Journal of Parallel and Distributed Computing, vol. 35, No. 1, May 25, 1996, pp. 2–17, (abstract only).

* cited by examiner

| | |
|---|---|
| ... | ... |
| n | ThisIsALongDirectoryName |
| n+1 | ThisIsALongFileName.ThisIsALongFileExtension |
| n+2 | ADXLXZTN |
| n+3 | VFS |
| ... | ... |

| # | parent | next | xxyy_child | flags | name | | |
|---|---|---|---|---|---|---|---|
| 0 | #entries | Freelist | z | dir | null | ... | ... |
| ... | ... | ... | ... | ... | ... | ... | ... |
| z | 0 | ... | z+1 | dir | n+3 | ... | ... |
| z+1 | z | ... | z+2 | dir | n | ... | ... |
| z+2 | z+1 | 0 | xx yy | file | n+1 | ... | ... |
| ... | ... | ... | ... | ... | ... | ... | ... |

FIG. 3 h0:vfs/~~00/ files: 00, 01, 02, .... FE,FF
h0:vfs/~~01/ files: 00, 01, 02, ..., FE, FF
h0:vfs/~~... files: 00, 01, 02, ..., FE, FF
h0:vfs/~~FE/ files: 00, 01, 02, ..., FE, FF
h0:vfs/~~FF/ files: 00, 01, 02, ..., FE, FF

| token | substring | size |
|---|---|---|
| t1 | "Test_1" | 6 |
| t2 | "Source" | 6 |
| t3 | "filename1" | 9 |
| t4 | "text" | 4 |
| t5 | "filename2" | 9 |
| t6 | "Output" | 6 |
| t7 | "binary" | 6 |

REPLACEMENT OF SUBSTRINGS IN FILE/DIRECTORY PATHNAMES WITH NUMERIC TOKENS

BACKGROUND OF THE INVENTION

The present invention is generally related to data processing systems; and more particularly is related to a method and system for the replacement of substrings in file and directory pathnames with numeric tokens.

Most file systems will complete a partial file or directory specification by using the current working directory information along with whatever partial information is given. This process of creating a complete, syntactically correct specification (the canonical form) is sometimes referred to as "canonicalization". This canonical form is important, since it completely and uniquely identifies the file system resource, whether a file, directory or some other type of resource.

Another important task is the semantic validation of a path, made up of the root, intermediate directories, and file or directory specification. All intermediate directories must be valid for a pathname to refer to a valid file system resource. The exception is that the final term, whether a file, directory or other name, might not exist at the time of validation, since the operation requested of the file system may be to create, or indeed, to check whether it exists.

These two tasks are often intertwined in a single function or set of functions. This makes sense in some file systems, such as UNIX's file system (UFS), where all resources are local and creations, modifications and deletions are all within the same data scope of an operating system process and can be easily synchronized.

The combination of these two functions can also effect some savings by being more efficient. If the current working directory for a given process is taken to be always valid (which assumes some method to prevent other processes from modifying that file system information while a process is "in it"), then validation of a path can start with the partial information specified by the user of the file system.

However useful this method of combining these two functions can be, it should always be remembered that these are two separate tasks. Severe performance penalties can be the cost of forgetting this. During recent development of a Virtual File System (VFS) and related network file system (NFS) work by the inventors, it was found that some NFS clients were sending remote procedure call (RPC) requests to validate each intermediate part of the path (via NFS_LOOKUP) instead of sending the full path as far as it was thought to be valid. This means in many cases 12 to 15 RPCs instead of a single RPC.

In the design of the file system that is structured on a client/server split, where the client portion keeps track of the current working directory and therefore has to perform the canonicalization, the path validation can often only be efficiently done by the server. The inventors' research has shown that in most cases even where there is no client/server split, it is advantageous to separate canonicalization from validation and perform these two operations in a close sequence, but not interleaving validation of intermediate path information with a forming of a canonical name. This results in a simpler implementation and superior performance, especially in a network environment.

SUMMARY OF THE INVENTION

In a network of computers, there is often a need to extend some operating systems' file systems to accommodate file and directory names that are not supported natively. When implementing Java Virtual Machines (JVMs) on file systems that only support "8.3" names (up to eight characters for the name and up to three characters for extension or type) this becomes very apparent. A trivial example is: "SomeJavaApplication.class", which violates both the eight character name and the three character extension limits. Special characters, DBCS (Double Byte Character Set), uppercase and lowercase letters, spaces within names and a host of other limitations can cause problems that limit the usefulness of an otherwise desirable file system.

A virtual file system (VFS) has been implemented that allows clients to map many names that use these problem characters and can far exceed the length of the file or directory name or total length of a "path". In general, a VFS is an indirection layer that handles the file-oriented system calls and calls the necessary functions in the physical file system code to perform input/output. The VFS consists of a Name Space Server accessed via TCP/IP sockets and a run-time VFS client. In a sense the run-time client intercepts names that are allowed to exceed the limits of the native file system and sends them to the Name Space Server to be converted into names that are supported natively.

In dealing with file/directory pathnames, the number of sometimes quite lengthy strings poses a significant problem, especially when these are broken into substrings which then are constantly compared to other substrings. By parsing the strings into their semantically correct substrings and replacing those substrings with unique numeric tokens, a significant improvement is realized in the storage of the strings as well as better performance in comparing those substrings. Since each substring (typically a subdirectory, filename or extension) is replaced with a numeric value, these numeric values can be arithmetically compared (e.g., is a ==b) instead of string compared (i.e., are all characters the same, what about uppercase vs. lowercase, etc.). This alone represents a substantial improvement in performance. In addition, by keeping a string dictionary, which the token uniquely indexes, only one copy is kept of any substring. This too can represent a substantial savings in the amount of storage needed to implement a file system.

BRIEF DESCRIPTION OF THE DRAWINGS

The invention is better understood by reading the following detailed description of the preferred embodiment in conjunction with the accompanying drawings, wherein:

FIG. 1 illustrates an example of the partial format of a string dictionary used in the preferred embodiment of the present invention;

FIG. 2 illustrates an example of the format of a mapping database used in the preferred embodiment of the present invention;

FIG. 3 illustrates the structure of a physical directory file layout;

FIG. 9 illustrates an example of a string dictionary used in the preferred embodiment of the present invention.

DETAILED DESCRIPTION OF THE PREFERRED EMBODIMENT

Figure 4:
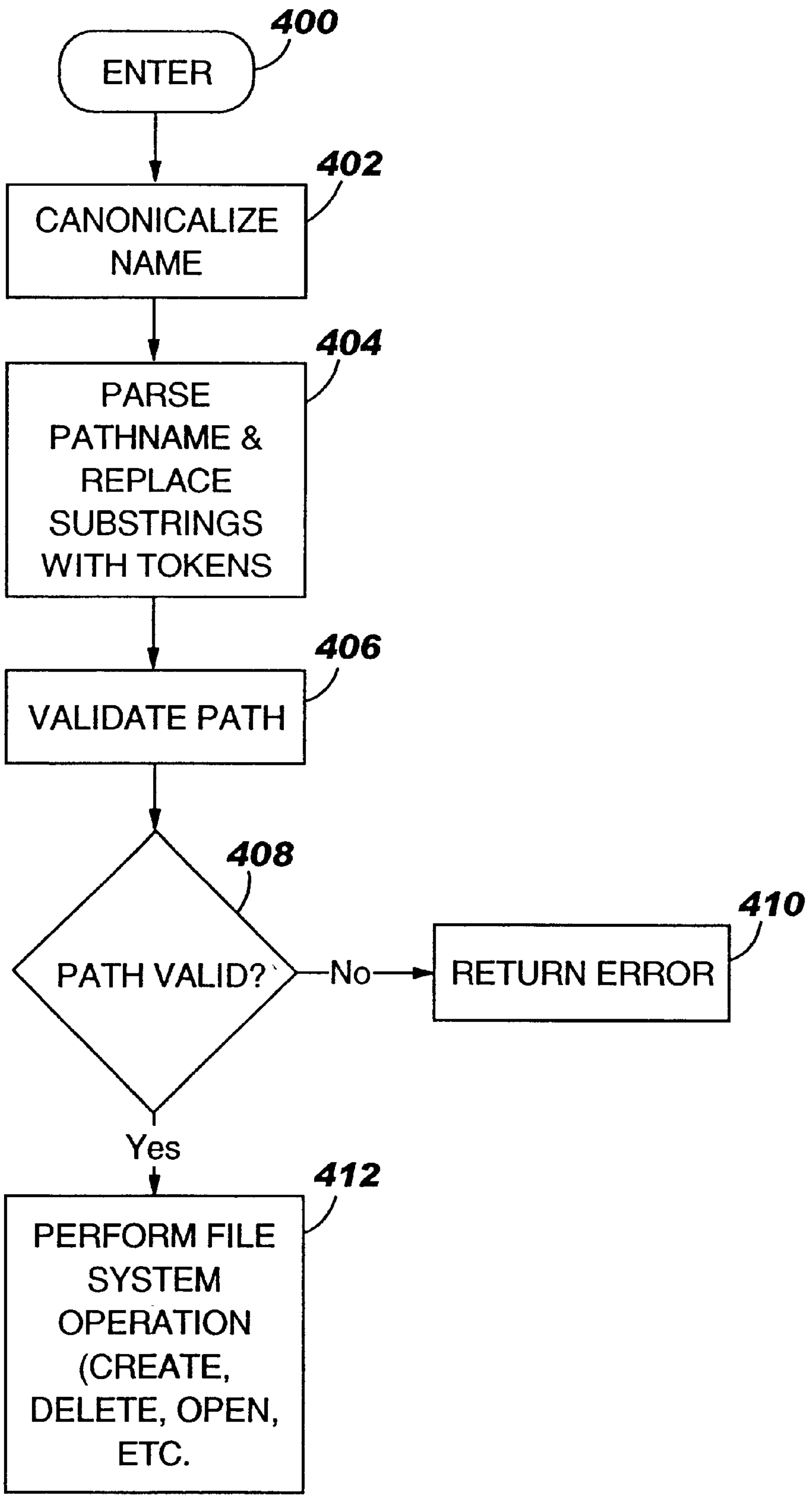
FIG. 4 illustrates a high level flowchart of the functions of the token replacement mechanism of the present invention.

Due to a need for directory and file names that are greater than can currently be supported in the existing File Allocation Table (FAT) file system, a Virtual File System (VFS) can be designed and implemented that can support much longer path lengths and completely avoid the 8.3 directory and file name limitations.

The VFS can be accessed by programs and users by referring to a virtual drive, e.g., 'VFS:'. The Virtual File Names (VFNs) are of the form:

node::VFS:/directory/ . . . /filename where 'node::' is the machine node network name; and the 'directory' and 'filename' specifiers are permitted to each be of up to 255 characters, with a total path length of 270 characters.

Underlying the VFS is the normal physical file system with all of the usual operating system features and limitations. The Real File Names (RFNs) will be placed under a system sub-directory on the controller or file server (h0:/VFS/ is the current name) and are of the form:

node::device_name:VFS/~~$X_1X_2$/$Y_1Y_2$ where 'node::' is the machine network node name; the 'device_name:' is the usual 'h0:' or 'h1:' pertaining to a specific implementation (IBM 4690 OS); hard disk device name: 'VFS/' is the system sub-directory under which all VFS system data files and all of the RFNs lie; '~~$X_1X_2$/' are special sub-directories created to hold the actual files that are in VFS ('$X_1$,' and '$X_2$' are the ASCII representations of the hexadecimal digits from '0' to 'F', i.e. one of '00', '01', '02', . . . 'FE', 'FF'); '$Y_1Y_2$' gives the physical name of the file (again the ASCII representation of two hex digits). The implementation of the invention; however, is not limited to any particular operating system platform, and those skilled in the art will readily appreciate that the invention can be implemented on many other platforms including Microsoft Corp.' s Windows 95/98 and Windows NT, IBM Corp.'s OS/2 as well as Sun Microsystems' Java Virtual Machine (JVM).

This scheme provides for 256*256 (64K) RFNs in a VFS logical volume (i.e. the 'VFS:' drive). All access to these physical files is through VFS code via their Virtual File Names (VFNs) except for certain system routines and utilities. An application or user will never see an RFN.

While actual files are represented as physical files, directories are only represented in VFS database files, along with information on the physical files within those directories. Information is kept as to distribution attributes as well as which nodes in the networked system actually have the physical files.

The VFS is implemented using a client/server split, where each user of the VFS accesses the files and directories by calling functions on their local machine. This is true for controllers as well as terminals. The client functions open a TCP/IP socket to the currently active controller in the system (perhaps even on the same physical machine) and make requests of the VFS server.

The function of this VFS Name Space Server is analogous to that of the TCP/IP network Domain Name Server (DNS) or bind server which maps IP addresses and node names back and forth. However, the VFS Name Space Server is involved in many simultaneous operations performed by numerous applications and therefore has some severe performance requirements and also does not have the IP name restrictions that limit the total number of usable names. The typical DNS implementation also does not face the dynamic creation and deletion of names and the attendant management problems that entails. Some of these differences are readily apparent when given some examples. A typical DNS would map the IP node name "mymachine.mysubnet.mydomain.net" to an IP address of the (for example) 9.67.5.1 and another IP node name with the same "mysubnet.my domain.net" would only differ in the least significant number (the ".1" might for instance become ".2"). These restrictions are documented in various Request For Comments (RFCs) documents (for example, RFCs 1034/2535) and are tightly controlled because of their impact on IP routers, which depend on these addresses to deliver packets to the correct sub-network.

In the VFS Name Space Server, Virtual File Names (VFNs) are reusable, in part, as long as different subdirectories make them unique and the real file names (RFNs) that they map to can be distinguished in some fashion. In addition, the VFNs can be very long in that they may contain a large number of subdirectories and there is no direct correlation between these intermediate components and the allocation of RFNs. As an example, the VFN "nodename::devicename:\dir1\dir2\dir3\dir4\dir5\file.name" can be mapped to the RFN "node name:: C:\xx\yz" where "xx" is a subdirectory (used to improve performance) and "yz" is an actual file. At the same time, a VFN of the "othernode::otherdevice:\otherdirectory\filename.extension" may map to RFN "othernode::otherdevice:\xx\yz", where "z" differs from "y" by only one character. In other words, the allocation of RFNs is totally independent of the logical proximity of the Virtual File Name.

The VFS Name Space Server is composed of three distinct parts: the string heap, the mapping database and the RFN allocation subsystem. The parsing of a canonical file/directory name into its individual component substrings and replacement with numeric tokens involves the specification of the VFN as either a file name (where file name is of the form "node::device:\directory\. . . \filename.extension") or a directory name (where directory name is of the form "node::device:\directory\. . . "). The string is decomposed by a parser which recognizes the subdirectory delimiters '\' or '/' and replaces each component of the path with a numeric token which uniquely specifies the original substring. The VFN is then located in the mapping database which associates with each VFN, in the case of an actual file, an RFN that is obtained from the RFN allocation subsystem. Virtual directories are also placed into the mapping database, but do not map to an RFN since directory VFNs are virtual.

The VFS server creates and maintains a database to provide information for all clients about the files and directories in the VS volume. The most frequent request is the 'find' operation which returns a physical name (i.e., an RFN) to allow the client code to create, open, delete and otherwise manipulate the file. Some requests are done completely on the server side (e.g., the 'rename' function) and some require more than one interaction between the client code and the server.

However, the application software does not normally use these client functions directly. Instead, the system-provided runtime libraries, such as PORTLIB.DLL for 32-bit 'C' programs, the Visual Age runtimes for 32-bitC/$C^{++}$ programs, as well as 16-bit link86able.LIB routines, call the VFS client functions "under-the-covers," providing transparent access to files and directories in the VFS volume.

Certain 'trusted' code, such as the Java Virtual Machine (JVM) and the command interpreter (the 'command prompt' and .BAT file processing code) can use the functions directly due to performance and possibly other reasons.

The client portion of the VFS consists of several functions that access the VFS server via TCP/IP sockets. The typical interaction between the client and server consists of a non-binding socketopen call by the client to the VFS server. If a socket is successfully opened, the client performs a send operation to transmit a request block and the client performs a receive operation to wait for the server's reply. If the non-binding open fails, then error recovery is needed to attempt to find another controller or to attempt in some other way to handle the problem. If the error turns out to be unrecoverable, then an appropriate error return is required.

The client code does more than just route the function requests to the server code. It also maintains the unique information that each client process uses, such as the current drive and working directory. The canonicalization process which turns each partial path/file name into a complete, fully qualified path/file name is done on the client, though the verification must be done on the canonical form at the server (the TransPath function).

The run-time VFS client contains APIs to deal with files and directories and passes requests to deal with native file system compliant names through the native operating system. The VFS hooks route the VFNs to the VFS Name Space Server via an RPC layer similar in some ways to the network file system (NFS) as described in various documents including RFC 1813. Note that file data transfer is not a function of this mechanism, only virtual file names (VFNs), their associated real file names (RFNs) and 'stat ( )' type information is transferred. All requests that deal with the data within a file are passed through the native file system.

The client code provides the following functions to users of the VFS:

int VFS_isinVFS(VFN * name);
int VFS_find(VFN *name, RFN *realname)
int VFS_create(VFN *name, RFN *realname)
int VFS_delete(VFN *name, RFN *realname)
int VFS_rename(VFN *from, VFN *to)
int VFS_stat(VFN *name, stat_struct *pstat)
int VFS_mkdir(VFS *dirname)
int VFS_rmdir(VFS *dirname)
int VFS_chdir(VFS *dirname)
char VFS_getcwd(VFN *dirname)
int VFS_readdir(VFSDIR *dir)

Each of these functions is invoked on the client and most interact with their server counterparts via a TCP/IP socket-based transport that conveys the request and the parameters to the server and the response from the server back to the client. A socket is opened from the client to the server for the duration of the call. This primitive RPC method is sufficient for all users of the service. The default port that the server "listens" on is currently "5555", but may change and this will be reflected in the Services TCP/IP configuration file.

Additional function is provided by the client code in several cases. A canonicalization process first performed on all VFNs, using the client's current working directory information to ensure a well-formed fully qualified path and file name is always provided to the server. Some functions are mostly or entirely implemented in the client code. The VFS_getcwd( )function simply returns the current working directory string to the caller. The VFS_chdir( ) function sets the client-maintained current working directory information after verifying with the VFS server that the new directory is valid.

Each of the functions are described as follows:

int VFS_isin VFS(VFN *name) returns either true or false, depending on whether the VFN contains one of the valid drive letters that indicate whether the specified file or directory name is in the VFS.

int VFS_find(VFN *name, RFN *realname) returns a string pointer (RFN *realname) that is the actual FAT/8.3 compliant name of the file. If the VFN passed in is not a file, but is a directory, an error code is returned that indicates this. If the VFN does not exist in the mapping database, an appropriate error code is returned.

int VFS_create(VFN *name, RFN *realname) allocates an RFN and associates it with the VFN passed in. It then returns a string pointer (RFN *realname) that is the actual FAT/8.3 compliant name of the file. No physical file is created. The client uses the normal runtime to actually open the file with the appropriate flags. Appropriate error codes are returned for conditions such as file already exists, no room available in file system (64 k file/dir limit) and so forth.

int VFS_delete(VFN *name, RFN *realname) deallocates the RFN and removes the VFN from the mapping database. It then returns a string pointer (RFN realname) that was the actual FAT/8.3 compliant name of the file. The physical file is not deleted. The client code uses the normal runtime to actually remove the physical file.

int VFS_rename (VFN *from, VFN *to) locates the first VFN (VFN *from) in the mapping database, validates that the second VFN (VFN *to) is valid and changes the VFN in the mapping database to reflect the changed name. If the name of a higher level directory in the *from or *to names (i.e. the path) is different, the file is moved from the first directory to the second. Error codes include: (1) error directory does not exist; (2) error *from file does not exist; (3) error *to file already exists; (4) error no room available in the file system (64 k file/dir limit). Conflicts in from/to names across nodes or involving DDA are considered errors as well and the system will not perform the rename. Alternatively an enhancement enables the client code to do a sequence of create/copy/delete in those instances. Rename request across different drive letters (e.g. 'rename adxlxztn::h0:\foo adxlxztn::vfs:/foo ') are also not permitted in the preferred embodiment but can be added in alternate embodiments in the same manner.

int VFS_stat(VFN *name, stat_struct *pstat) works only on virtual files and directories. The client sees the regular file system for file stat( ) information. The VFS server provides the information for directories. Error codes include file/directory name does not exist, etc. The server returns the RFN of a file to the client code if and only if the VFN denotes a file in the VFS, however, the length of the RFN field is used to return the mapping database index (used as the inode of directories) and a null RFN for directories. This is because there is no "normal" file system information for virtual directories (i. e., no RFN exists).

int VFS_mkdir(VFN *dirname) takes the fully qualified directory name (VFN *dirname) and adds it to the mapping database. Error codes include error directory already exists, error in pathname (a higher level directory does not exist), and error no room available in file system (64 k file/dir limit).

int VFS_rmdir(VFN *dirname) removes the filly qualified directory name (VFN *dirname) from the mapping database. Error codes include error in pathname (some directory in *dirname does not exist) and the directory is not empty.

int VFS__chdir(VFN *dirname) is not a server-side operation. The client-side code maintains the concepts of a current drive and working directory and this function allows the application code to manipulate the process-level current working directory. Verification is performed on the target directory name (VFN *dirname) and error codes include error target directory does not exist, etc.

char *VFS__getcwd(VFN *dirname) is not a server-side operation. Like the VFS__chdir( ) function it deals with the per-process current working directory. This function simply returns a pointer to the character string that contains the current working directory. No error codes are supported.

int VFS__readdir(VFSDIR *dir) takes a valid directory structure which includes a valid directory VFN, and on the first call will return the structure with information about the first file/directory within the target directory. Subsequent calls with the same VFSDIR structure returns updated information on the next directory entry within the specified target directory. Error codes include error directory does not exist.

The VFS server maintains the database of information and the actual underlying physical files. Communications between the client and server portions are via IP sockets using a custom RPC protocol which allows for a synchronous response from the server code to the client code for each request.

As requests are received for access to files and directories in the VFS, as indicated by a virtual device/drive (e.g., 'VFS:', they are routed to a file name hashing and sub-allocation scheme. This comprises three (3) parts as follows:

1. A string 'dictionary' that contains all strings for directory and file name identification.
2. A mapping database associating virtual file names (VFNs) with real file names (RFNs).
3. An RFN allocation scheme that keeps track of what real files currently exist.

The assumption is made that all files placed on this virtual drive are subject to name hashing and attendant sub-allocation, even if the names are valid in the 8.3 FAT file system. In addition, all directories created on this virtual drive will have entries in the mapping database. This solves several problems, including the fast location of files and certain directory operations.

In order to allow access to the data structures and algorithms, the following higher level functions are available on the server:

VFS__find( ) given a VFN, locates and returns an RFN.

VFS__create( ) given a VFN, allocates an RFN, updates the mapping database information and returns the RFN. Further calls to normal file system function are needed to actually create and open the real file.

VFS__delete( ) given a VFN, deallocates the associated RFN and cleans up the mapping database information.

VFS__rename( ) given two (2) VFNs, changes the mapping database information to reflect the new name.

VFS__stat( ) given a VFN, locates and returns information about VFS directories.

VFS__mkdir( ) given a VFN, creates the directory information in the mapping database.

VFS__rmdir( ) given a VFN, removes the directory information from the mapping database.

VFS__readdir( ) given a VFN in the passed in VFSDIR structure, on the first call to this function, locates the first directory entry and returns the structure with that directory information as well as the directory's first VFN/RFN and other information. On subsequent calls to this function given the same VFS directory information structure, returns the structure with the next VFN/RFN and other information These functions will be used (sometimes in combination) to provide to clients (both terminals and controllers) all file system services.

The string 'dictionary' contains all strings that are part of a fully qualified path and file name, i.e. they are 'canonical'. For example:

"ADXLXZTN::VFS:\ThisIsALongDirectoryName\ThisIsALongFileName.ThisIsALongFileExtension."

When this string is parsed into its component parts it appears in the dictionary 10 as indicated in FIG. 1 where "n" is simply the index in the dictionary table where the strings are inserted. String dictionary 10 depicts an index field 12 and a corresponding string field 14. The entries in the dictionary are not assumed to be sequential, but may be inserted in whatever order space is available. If a string already exists in the table, it is not inserted again, i.e., all strings in the table are unique in the dictionary. There is no need to delete entries from the dictionary as file and directory names may be used in many places and are often created and deleted repeatedly.

While the case of letters is not significant, it is preserved as whatever the file or directory name creation indicated. This allows an efficient hashing function algorithm. An easily implementable configurable option would be to consider case significant.

The implementation of this layer uses a string hashing scheme, the current version of which depends on a 4096 entry hash vector and a string summation and shifting hash function. This gives a very good distribution over the test sample which consists of 65,534 file and directory names from the HotJava browser, Jigsaw web server, and the Java Compatibility Kit (JCK) 1.1.6a. There are 35,369 unique strings in this test sample which average 11.5 characters each, producing a 410,191 byte dictionary. The hash function produces only 54 empty buckets and a maximum bucket size of 40 items. The simple arithmetic average of all non-empty buckets is 6 items and the weighted arithmetic mean is 13 items. An additional enhancement keeps the items in buckets sorted in a decreasing frequency of use order that also helps retrieval performance.

The string dictionary is used by the mapping database to keep very short entries that fully describe the unique, canonical path and file name associated with a particular file (virtual name), without having to keep the complete canonical path and file name in the mapping table.

The mapping database connects a logical name with a physical name. An entry in the mapping database consists of a fixed length structure that contains six 16-bit values that are the indices to other mapping table entries, RFN indicators, flags and indices into the string dictionary. Following the example provided for the string dictionary, an example for the mapping database 20 is illustrated in FIG. 2. The mapping database 20 depicts a number of fields including mapping table entry number 22, parent entry 24, next entry 26, xx|yy field 28 (described below), flags field 30 and name (index) field 32. In FIG. 2, "0, z, z+1 and z+2" are simply mapping table entry numbers and "n, n+1, n+3" are the indices (also referred to as tokens) into the dictionary table where the complete strings are kept and xx, yy are two 1-byte fields that represent the physical directory and file that the virtual file name is mapped to. If a table entry is a directory, then the xx, yy field is reused to indicate the mapping table entry that contains the first file in the directory. A free-entry (deleted) list and the number of entries in the table are maintained to avoid having to reorder table entries. This linked list is pointed to by the '.next' field in the root entry of the mapping database (i.e. the zero-th entry) and the number of entries in use is maintained in the '.parent' field of the same entry.

The virtual "device", in this case drive "VFS:", is added to the table and pointed to by the root entry. This enables expansion of this scheme to include other virtual drives.

The 'real' file name (RFN) allocation scheme is tied closely into the mapping database. It consists of a bit-map, logically 256×256 bits (i.e. 256×32 bytes, or 8192 bytes), where each bit represents a physical file. An example of the layout on the disk of the physical file allocation scheme is illustrated in FIG. 3.

There are up to 256 sub-directories under the home (/vfs) directory, each with a 4 character name from '~~00' to '~~FF' (i.e., ASCII representation of hex 0×00 through 0xff), and up to 256 files in each sub-directory with names (similar to the sub-directories) from '00' through 'FF'.

As files are created, the bits representing the corresponding files are set to '1' and when the file is deleted, reset back to '0'. There is no mapping of virtual sub-directories to physical sub-directories, the physical sub-directories exist only to keep performance optimal. Virtual directories are only retained in the mapping database and have no physical counterpart.

As RFNs are allocated with this scheme, an extended attribute file with the same name, but with the added ".A" extension (e.g. "h0:vfs/~~ab/cd.A", where ab and cd are the ASCII representation of a two digit hexadecimal number). The full, canonical virtual pathname of the file is written into this extended attribute file to provide both a simple way of mapping from an RFN back to the associated VFN and a way of associating other extended attributes with this file (e.g. icons).

Each time a change is made in one of the in-memory database tables, a corresponding change is required to the version of that database table kept on the hard disk. This serves several purposes, the primary being the reliability of the VFS function in the operating system. If a machine is rebooted or a power loss occurs during a directory or file creation, deletion or rename, unforseeable errors can occur if the database was being changed and was temporarily invalid.

Therefore, all VFS directory and file name, create, delete and rename functions are processed in the following sequence:

1. a request is received for a create, delete, mkdir, rmdir or rename function;
2. the transaction log is opened and the request information is written into it;
3. the request starts being processed by the server; and
4. as a change is made to the in-memory database tables, the corresponding change to the database files is determined;
5. the file changes are written into the transaction log file;
6. after all changes have been made to the in-memory version and all changes to the file version have been determined and written to the transaction log, (1) the result and return code are written into the transaction log, and (2) the result and return code is sent back to the client;
7. the transaction log is processed, making all changes necessary to all database files and after all changes are complete; and
8. the transaction log is reset to zero length and closed.

If a power loss occurs at anytime during this process, either the transaction can still be cancelled without problems, or all information is securely written to the disk so the server can recover when power is restored.

This should allow reasonably stateless file updates to occur after server function is restored by simply writing all data in the transaction log to the correct files and therefore setting the database to a known state. This state would then agree with all clients who have received results back from calls to the server.

If a transaction log is incomplete (the final results and return code are not in the file), when server function is restored, the transaction log is truncated to zero length and processing continues.

The format in the transaction log of the VFS client requests are:

1. client node name (null terminated character array);
2. client VFS request (16-bits);
3. length of VFN #1 (16-bits: value is up to MAXVFNLEN bytes);
4. Virtual File Name #1 (null terminated character array);
5. length of VFN #2 (16-bits: value is up to MAXVFNLEN bytes);
6. Virtual File Name #2 (null terminated character array);

This format derives directly from the client request block used to transport the request from the client to the server.

The format in the transaction log of the database file updates are:

1. database file name manifest (32-bits);
2. file offset at which to write data (32-bits);
3. data block size (32-bits);
4. data block (variable length);

The format in the transaction log of the VFS server reply will be:

1. return code (16-bits);
2. length of returned RFN (if any. 16-bits: value is up to MAXRFNLEN);
3. Real File Name (null terminated character array);

The above format derives directly from the server reply block used to transport the reply from the server back to the client.

FIG. 4 illustrates a high level flowchart of the token replacement process of the present invention. The process starts in entry block 400 in which the current working directory and filename (e.g., current-work-dir=\dir1\dir2; name=filename) are input to the canonicalization process as indicated by logic block 402. This action results in the canonical form such as pathname=\dir1\dir2\filename. This is followed in logic block 404 with parsing of the pathname and replacement of substrings with tokens. The substrings in this small example are "dir1", "dir2", and "filename". The result of this action are tokens t1, t2, and t3. The validation of the path is the next act in the process as indicated by logic block 406. From this act the process continues in decision block 408 with a determination of the validity of the path. If the path is found to be invalid an error is returned as indicated by termination block 410. Otherwise, the path is found to be valid and a file system operation is performed as indicated in logic block 412.

Figure 5:
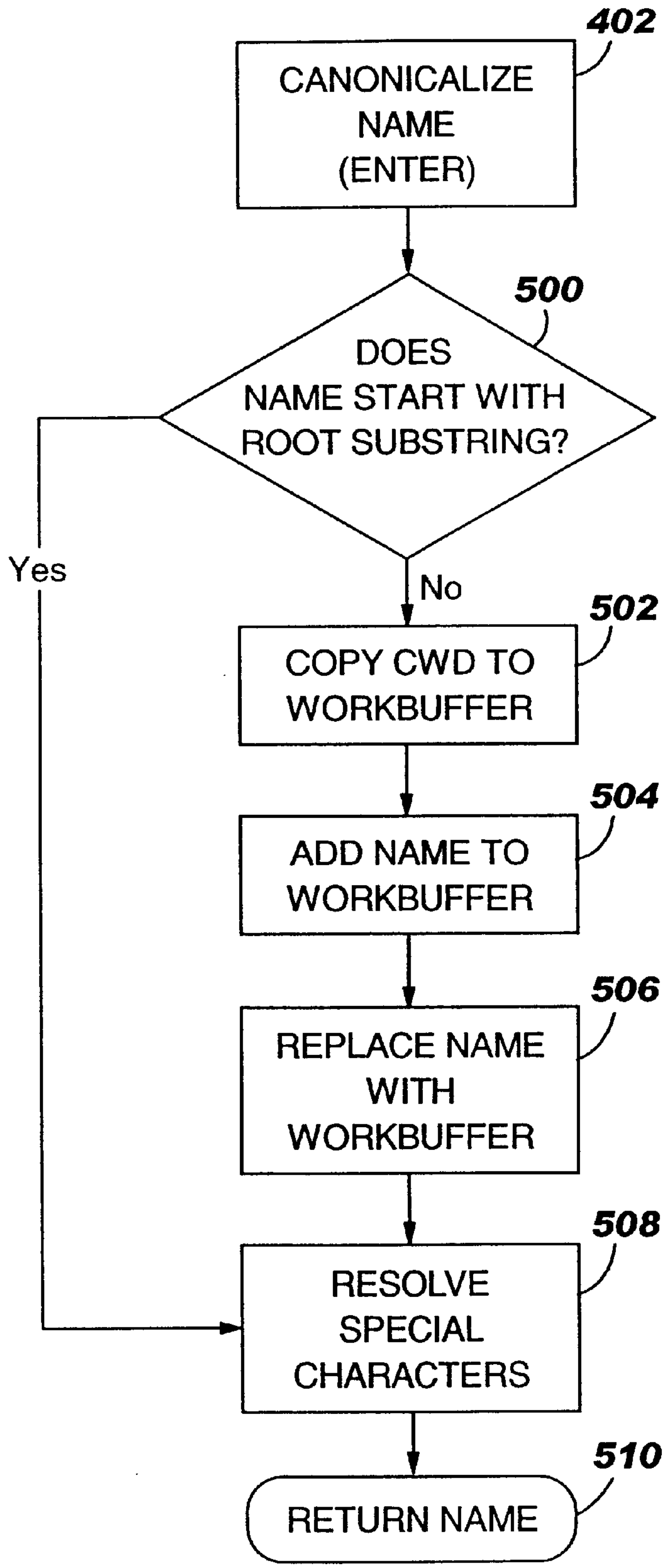
FIG. 5 illustrates a flowchart of the canonicalization process of the present invention.

FIG. 5 illustrates the specific acts of the canonicalization process 402 of FIG. 4. It begins in decision block 500 with a determination if the name starts with a root substring. If it does, then processing jumps to logic block 508 for resolution of special characters in the name. If the name does not start with a root substring, then in logic block 502 the current working directory is copied to a work buffer. The content of the work buffer at this point in the process is \dir1\dir2. Next, the name (i.e., filename) is added to the work buffer as indicated in logic block 504. The content of the work buffer at this point is \dir1\dir2\filename. In logic block 506, the name is replaced with the work buffer contents. The process concludes in logic block 508 with the resolution of special characters such as ".." or ".". The canonicalization process exits back to the many processing logic in termination block 510.

Figure 6:
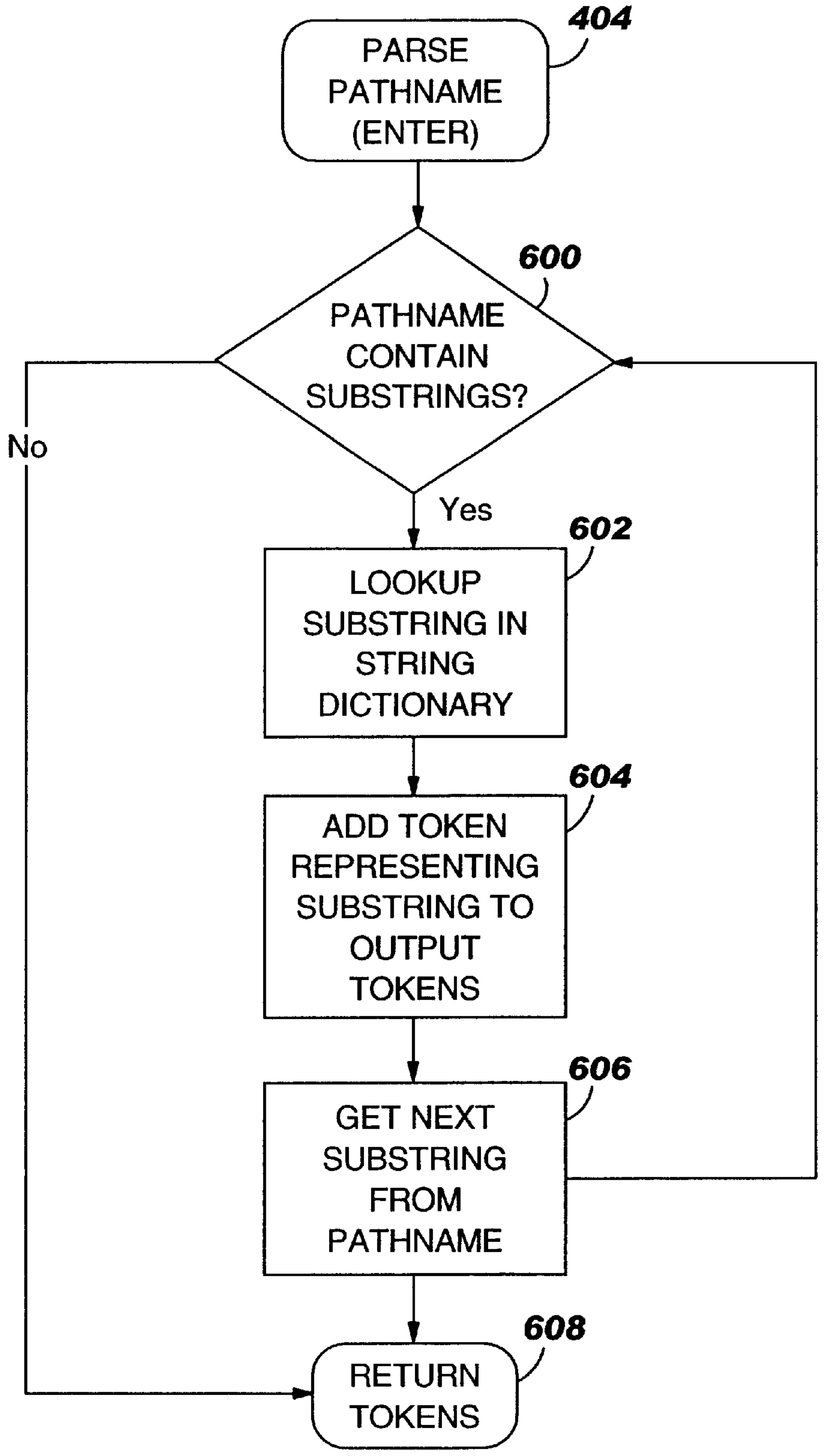
FIG. 6 illustrates a flowchart of the parsing process of the present invention.

FIG. 6 illustrates a flowchart of the parsing process 404 of the present invention. It commences with the entry of decision block 600 which initiates an iterative routine to perform as long as the pathname contains substrings. The iterative routine begins in logic block 602 in which a substring is looked up in the string dictionary. If the substring does not exist then a new token is created to represent that substring. In logic block 604, the token representing the substring is added to a list of output tokens for the pathname. The next act is to get the next substring from the pathname as indicated in logic block 606. The iterative routine loops back to decision block 600. After the entire pathname has been parsed into substrings and replaced with tokens (DONE indication out of decision block 600 ), the parsing process retuns the tokens found as indicated in termination block 608.

Figure 7:
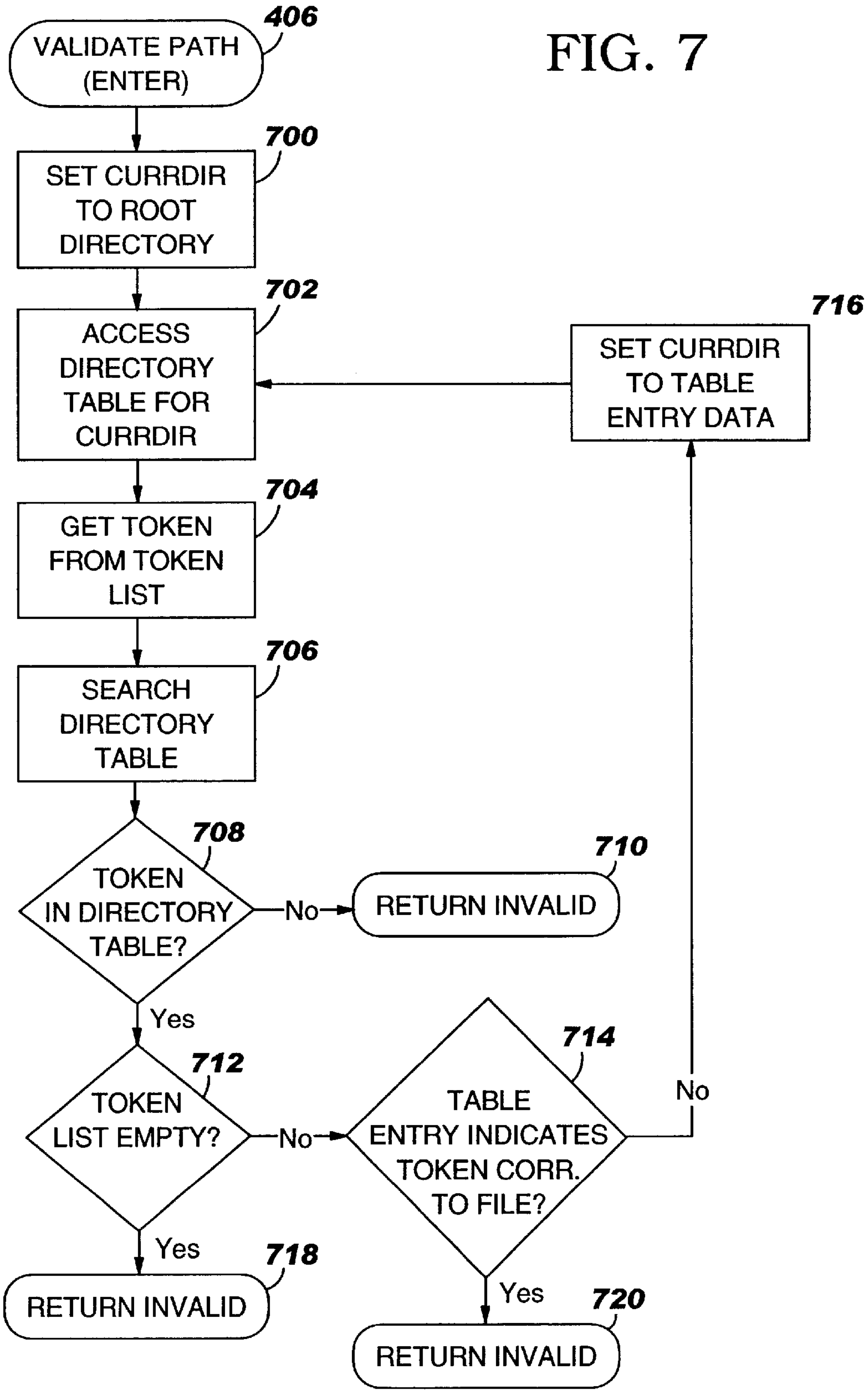
FIG. 7 illustrates a flowchart of validation process of the present invention.

FIG. 7 illustrates a flowchart of the validation process 406 of the present invention. The token list is input to logic block 700 in which the current directory is set to the root directory. In logic block 702, the directory table is accessed for the current directory. This is followed in logic block 704 with the act of getting a token from the token list. Next, in logic block 706, a search is performed to locate the token in the directory table. In decision block 708, a test is made to determine if the token was found in the directory table. If the search failed, then an invalid pathname indication is returned to the main processing logic via termination block 710. If the search was successful, processing continues in decision block 712, in which a test is made to determine if the token list is empty. If not, the processing continues in decision block 714 in which a determination is made as to whether or not the directory table entry found is for a file (rather than for a directory). If the directory table entry is for a directory, then processing continues in logic block 716 in which the current directory is set to the table entry data; processing then returns to logic block 702. If the directory table entry found in decision block 714 is for a file, then processing ends in termination block 720 with an invalid pathname indication. If, in decision block 712, the token list was found to be empty (i.e., all tokens have been processed) then processing exits in termination block 718 with the return of an valid pathname.

Figure 8A:
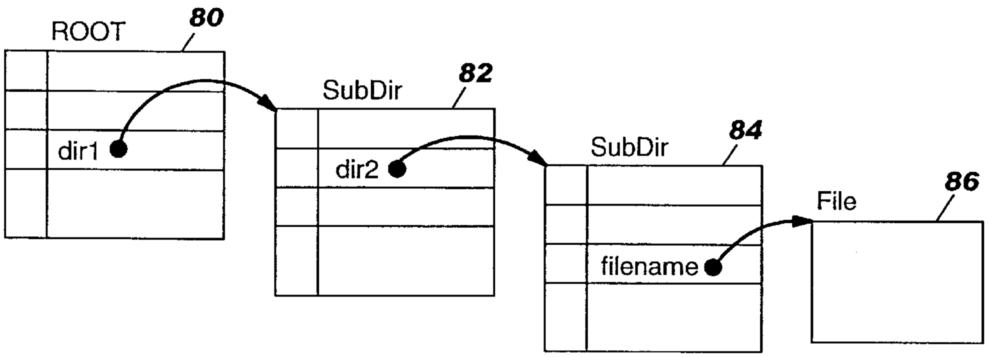
FIGS. 8A–8B depict the prior art method of storing directory and file names and the mechanism used in the present invention to store directory and file names using numeric tokens.
Figure 8B:
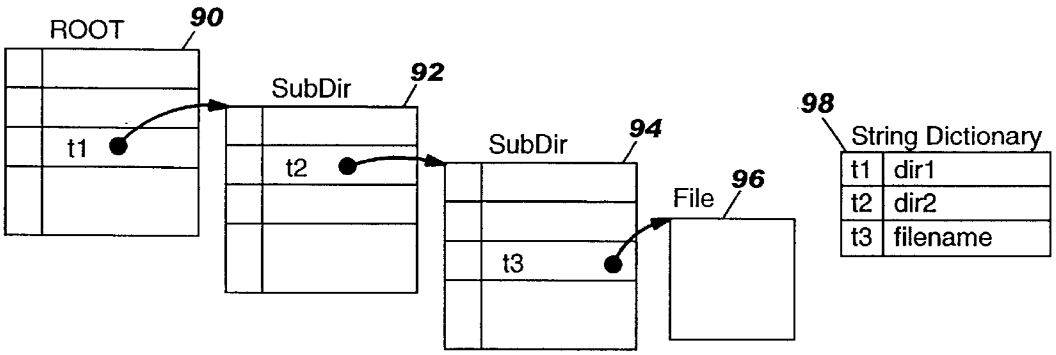

FIGS. 8A–8B indicate both the prior art and the inventive method of storing directory and file names on a storage device, such as a disk. FIG. 8A shows a linked list structure with dir1 stored in root block memory location 80, dir2 stored in subdirectory block memory location 82, the filename stored in subdirectory block memory location 84, and the actual file stored at memory location 86. FIG. 8B indicates the method of storing directory and pathnames according to the present invention. Token t1 is stored in root block memory location 90, token t2 is stored in subdirectory block memory location 92, token t3 is stored in subdirectory block memory location 94 which contains a pointer to the file stored at memory location 96. Also shown in FIG. 8B is the string dictionary 98 corresponding to this simple example.

A simple example of the use of the invention demonstrating its advantages is described below:

The filenames

String1=\test_1\Source\filename1.text

String2=\test_1\Source\filename2.text

String3=\test_1\Source\filename1.Output

String4=\test_1\Source\filename2.Output

String5=\test_1\Output\filename1.binary

String6=\test_1\Output\filename2.binary contain 7 unique semantically significant substrings: "Test_1 ", "Source", "filename1", "filename2 ", "text", "output" and "binary".

If placed into a table (or dictionary) as illustrated in FIG. 9, it is easy to see that a representation of the original substrings based on their position in the table would be (given the assumption that a "." is inserted in place of the "\" in front of the final token):

String1={t1, t2, t3, t4 }

String2={t1, t2, t5, t4 }

String3={t1, t2, t3, t6 }

String4={t1, t2, t5, t6 }

String5={t1, t6, t3, t7 }

String6={t1, t6, t5, t7 }

A simple comparison of the amount of storage to hold this information is as follows:

| | Traditional method | New Method |
|---|---|---|
| String 1 = | 6 + 6 + 9 + 4 = 25 bytes | 8 bytes |
| String 2 = | 6 + 6 + 9 + 4 = 25 bytes | 8 bytes |
| String 3 = | 6 + 6 + 9 + 6 = 27 bytes | 8 bytes |
| String 4 = | 6 + 6 + 9 + 6 = 27 bytes | 8 bytes |
| String 5 = | 6 + 6 + 9 + 6 = 27 bytes | 8 bytes |
| String 6 = | 6 + 6 + 9 + 6 = 27 bytes | 8 bytes |
| | 158 total bytes | 48 total bytes |

However, this greater than 3 to 1 comparison ratio is not quite entirely complete in that there is an "overhead" of 81 bytes to store the substrings in a dictionary (as null-terminated strings) along with the pointers to locate them. This overhead, while not negligible, is not as significant as the savings in replacing substrings with 2-byte numeric tokens.

The difference in speed of comparison is not quite so readily calculated. It is clear that comparing a new string:

StringN=\Test_1\Output\filename2.binary.NEW with String6, character by character, would involve 32 comparisons of single bytes until a mismatch is found. A simple comparison of the two strings using the token-scheme would require four comparisons of 2-byte tokens.

Again, this 8 to 1 ratio is not entirely complete in that the conversion of the strings into substrings and proper insertion into the table require some overhead, but in a file system where locating information is much more frequent than inserting, removing or renaming it, this overhead is not as significant as the savings in numeric comparisons verus string comparisons.

A third advantage that is usually involved whenever data compression is present is the additional security for a file system that uses the new method. Several schemes could be easily applied to prevent the string dictionary from being accessed even though the file and directory names may be available. This is the "shared-secret" type of security and is the most difficult to decrypt. While the substrings themselves can also be encrypted, it would be easier to take advantage of the clean split between the semantic information embodied in the tokens and the human-readable form of the strings to deter someone from locating secure information in a file system.

The fourth advantage is that of the additional flexibility that tokenizing the substrings provides. Since the actual substrings are stored in a separate place from the directory and file information in the native file system, limits on the length of a substring, overall length of a path (composed of many substrings) as well as the permissible characters in any substring can be much different than those imposed by the native file system. As long as the sequence of tokens can be uniquely mapped to a native file system resource practically any string can be accommodated. The tokens are used only to uniquely represent the substrings, wherever they may be used in a file system name. A clear example is the above use of "Output" as both a sub-directory name and as a file "extension" in String3 and String5 for instance.

The file/directory pathnames token replacement mechanism of the present invention has been described as a computer program that can be resident on one or more host computers such as a workstation, a network device, or a server device. As such, the token replacement mechanism can stored as an application on any network device. It is important to note, however, that those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as cassettes or CD ROMS and transmission type media such as analog or digital communication links.

Additionally, corresponding structures, materials, acts, and equivalents of all means plus function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the present invention.

What is claimed is:

1. A method for replacing substrings in file and directory pathnames with tokens in a computer-implemented file system, comprising the acts of:

reading a name string to be converted into a list of tokens;

canonicalizing a current working directory and the name string to form a pathname containing a plurality of substrings;

parsing the pathname and replacing each substring with an associated token; and validating the parsed pathname containing the list of tokens.

2. The method for replacing substrings in file and directory pathnames with tokens of claim 1 wherein the act of canonicalizing includes the acts of:

determining if the read name string starts with a root substring;

if the act of determining indicates that the read name string does not begin with a root substring, performing the additional acts of:

copying the current working directory to a working buffer;

adding the name string to the working buffer; and replacing the read name string with the contents of the working buffer.

3. The method for replacing substrings in file and directory pathnames with tokens of claim 2 wherein the act of canonicalizing further includes the act of resolving any special characters contained in the name string.

4. The method for replacing substrings in file and directory pathnames with tokens of claim 1 wherein the act of parsing the pathname includes the acts of:

dissecting the pathname into a plurality of substrings;

for each substring in the pathname, performing the additional acts of:

searching for the substring in a string dictionary; and adding a token corresponding to the substring to the list of output tokens representing the pathname; and returning the list of tokens for further processing in the act of validating the parsed pathname.

5. The method for replacing substrings in file and directory pathnames with tokens of claim 4 wherein the act of parsing the pathname further includes the act of creating a new token for any substring that is not found in the search of the string dictionary.

6. The method for replacing substrings in file and directory pathnames with tokens of claim 1 wherein the act of validating includes the acts of:

setting the current directory to a root directory;

accessing a directory table to locate the current directory;

getting a token from the list of output tokens;

searching the directory table for the output token; and while the list of output tokens is not empty and the table entry data indicates that the token does not correspond to a file name, setting the current directory to the table entry data and repeating the acts of accessing, getting and searching.

7. The method for replacing sub strings in file and directory pathnames with tokens of claim 6 wherein the act of validating further includes the act of returning an invalid pathname if the token is not found in the directory table, or the list of output tokens is not empty and the table entry data indicates that the token corresponds to a file name.

8. The method for replacing substrings in file and directory pathnames with tokens of claim 6 wherein the act of validating further includes the act of returning a pathname valid indication after each token from the list of output tokens has been found in the directory table.

9. A method for enhancing performance related to a selected file system operation in a computer-implemented file system, comprising the acts of:

reading a name string on which to conduct a file system operation;

canonicalizing a current working directory and the name string to form a pathname containing a plurality of substrings;

parsing the pathname and replacing each substring with an associated token;

validating the parsed pathname containing a list of tokens; and performing the selected file system operation on the parsed pathname.

10. The method for enhancing performance related to a selected file system operation of claim 9 wherein the act of canonicalizing includes the acts of:

determining if the read name string starts with a root substring;

if the act of determining indicates that the read name string does not begin with a root substring, performing the additional acts of:

copying the current working directory to a working buffer;

adding the name string to the working buffer; and replacing the read name string with the contents of the working buffer.

11. The method for enhancing performance related to a selected file system operation of claim 10 wherein the act of canonicalizing further includes the act of resolving any special characters contained in the name string.

12. The method for enhancing performance related to a selected file system operation of claim 9 wherein the act of parsing the pathname includes the acts of:

dissecting the pathname into a plurality of substrings;

for each substring in the pathname, performing the additional acts of:

searching for the substring in a string dictionary; and adding a token corresponding to the substring to a list of output tokens representing the pathname; and returning the list of tokens for further processing in the act of validating the parsed pathname.

13. The method for enhancing performance related to a selected file system operation of claim 12 wherein the act of parsing the pathname further includes the act of creating a new token for any substring that is not found in the search of the string dictionary.

14. The method for enhancing performance related to a selected file system operation of claim 9 wherein the act of validating includes the acts of:

setting the current directory to a root directory;

accessing a directory table to locate the current directory;

getting a token from a list of output tokens;

searching the directory table for the output token; and while the list of output tokens is not empty and the table entry data indicates that the token does not correspond to a file name, setting the current directory to the table entry data and repeating the acts of accessing, getting and searching.

15. The method for enhancing performance related to a selected file system operation of claim 14 wherein the act of validating further includes the act of returning an invalid pathname if the token is not found in the directory table, or the list of output tokens is not empty and the table entry data indicates that the token corresponds to a file name.

16. The method for enhancing performance related to a selected file system operation of claim 14 wherein the act of validating further includes the act of returning a pathname valid indication after each token from the list of output tokens has been found in the directory table.

17. A computer readable medium containing a computer program product for replacing substrings in file and directory pathnames with tokens in a computer-implemented file system, comprising:

program instructions that read a name string to be converted into a list of tokens;

program instructions that canonicalize a current working directory and the name string to form a pathname containing a plurality of substrings;

program instructions that parse the pathname and replace each substring with an associated token; and program instructions that validate the parsed pathname containing the list of tokens.

18. The computer program product of claim 17 wherein the program instructions that canonicalize include:

program instructions that determine if the name string read starts with a root substring;

program instructions that copy the current working directory to a working buffer;

program instructions that add the name string to the working buffer; and program instructions that replace the read name string with the contents of the working buffer.

19. The computer program product of claim 18 wherein the program instructions that canonicalize further include program instructions that resolve any special characters contained in the name string.

20. The computer program product of claim 17 wherein the program instructions that parse the pathname include:

program instructions that dissect the pathname into a plurality of substrings;

program instructions that search for each substring in a string dictionary;

program instructions that add a token corresponding to the substring to the list of output tokens representing the pathname; and program instructions that return the list of tokens for further processing by the program instructions that validate the parsed pathname.

21. The computer program product of claim 20 wherein the act of parsing the pathname further include program instructions that create a new token for any substring that is not found in the search of the string dictionary.

22. The computer program product of claim 17 wherein the program instructions that validate include:

program instructions that set the current directory to a root directory;

program instructions that access a directory table to locate the current directory;

program instructions that get a token from the list of output tokens;

program instructions that search the directory table for the output token; and while the list of output tokens is not empty and the table entry data indicates that the token does not correspond to a file name, program instructions that set the current directory to the table entry data and repeat the program instructions that access, get and search.

23. The computer program product of claim 22 wherein the program instructions that validate further include program instructions that returns an invalid pathname if the token is not found in the directory table, or the list of output tokens is not empty and the table entry data indicates that the token corresponds to a file name.

24. The computer program product of claim 22 wherein the program instructions that validate further include the program instructions that return a pathname valid indication after each token from the list of output tokens has been found in the directory table.

25. A computer readable medium containing a computer program product for enhancing performance related to a selected file system operation in a computer-implemented file system, comprising:

program instructions that read a name string on which to conduct a file system operation;

program instructions that canonicalize a current working directory and the name string to form a pathname containing a plurality of substrings;

program instructions that parse the pathname and replace each substring with an associated token;

program instructions that validate the parsed pathname containing a list of tokens; and program instructions that perform the selected file system operation on the parsed pathname.

26. The computer program product of claim 25 wherein the program instructions that canonicalize include:

program instructions that determine if the name string read starts with a root substring;

program instructions that copy the current working directory to a working buffer;

program instructions that add the name string to the working buffer; and program instructions that replace the read name string with the contents of the working buffer.

27. The computer program product of claim 26 wherein the program instructions that canonicalize further include program instructions that resolve any special characters contained in the name string.

28. The computer program product of claim 25 wherein the program instructions that parse the pathname includes:

program instructions that dissect the pathname into a plurality of substrings;

program instructions that search for each substring in a string dictionary;

program instructions that add a token corresponding to the substring to a list of output tokens representing the pathname; and program instructions that return the list of tokens for further processing by the program instructions that validate the parsed pathname.

29. The computer program product of claim 28 wherein the program instructions that parse the pathname further include program instructions that creates a new token for any substring that is not found in the search of the string dictionary.

30. The computer program product of claim 25 wherein the program instructions that validate include:

program instructions that set the current directory to a root directory;

program instructions that access a directory table to locate the current directory;

program instructions that get a token from a list of output tokens;

program instructions that search the directory table for the output token; and while the list of output tokens is not empty and the table entry data indicates that the token does not correspond to a file name, program instructions that set the current directory to the table entry data and repeat the program instructions that access, get and search.

31. The computer program product of claim 25 wherein the program instructions that validate further include program instructions that returns an invalid pathname if the token is not found in the directory table, or the list of output tokens is not empty and the table entry data indicates that the token corresponds to a file name.

32. The computer program product of claim 25 wherein the program instructions that validate further include program instructions that returns a pathname valid indication after each token from the list of output tokens has been found in the directory table.

33. A system for replacing substrings in file and directory pathnames with tokens in a computer-implemented file system, comprising:

an input module that reads a name string to be converted into a list of tokens;

a module that canonicalizes a current working directory and the name string to form a pathname containing a plurality of substrings;

a module that parses the pathname and replaces each substring with an associated token; and a module that validates the parsed pathname containing the list of tokens.

34. The system for replacing substrings in file and directory pathnames with tokens of claim 33 wherein the module that canonicalizes includes:

a module that determines if the name string read starts with a root substring;

a module that copies the current working directory to a working buffer;

a module that adds the name string to the working buffer; and a module that replaces the read name string with the contents of the working buffer.

35. The system for replacing substrings in file and directory pathnames with tokens of claim 34 wherein the module that canonicalizes further includes a module that resolves any special characters contained in the name string.

36. The system for replacing substrings in file and directory pathnames with tokens of claim 33 wherein the module that parses the pathname includes:

a module that dissects the pathname into a plurality of substrings;

a module that searches for the substring in a string dictionary;

a module that adds a token corresponding to the substring to the list of output tokens representing the pathname; and a module that returns the list of tokens for further processing in the module that validates the parsed pathname.

37. The system for replacing substrings in file and directory pathnames with tokens of claim 36 wherein the module that parses the pathname further includes a module that creates a new token for any substring that is not found in the search of the string dictionary.

38. The system for replacing substrings in file and directory pathnames with tokens of claim 33 wherein the module that validates includes:

a module that sets the current directory to a root directory;

a module that accesses a directory table to locate the current directory;

a module that gets a token from the list of output tokens;

a module that searches the directory table for the output token; and while the list of output tokens is not empty and the table entry data indicates that the token does not correspond to a file name, a module that sets the current directory to the table entry data and causes a return to the module that accesses.

39. The system for replacing substrings in file and directory pathnames with tokens of claim 38 wherein the module that validates further includes a module that returns an invalid pathname if the token is not found in the directory table, or the list of output tokens is not empty and the table entry data indicates that the token corresponds to a file name.

40. The system for replacing substrings in file and directory pathnames with tokens of claim 38 wherein the module that validates further includes a module that returns a pathname valid indication after each token from the list of output tokens has been found in the directory table.

41. A system for enhancing performance related to a selected file system operation in a computer-implemented file system, comprising:

a module that reads a name string on which to conduct a file system operation;

a module that canonicalizes a current working directory and the name string to form a pathname containing a plurality of substrings;

a module that parses the pathname and replaces each substring with an associated token;

a module that validates the parsed pathname containing a list of tokens; and a module that performs the selected file system operation on the parsed pathname.

42. The system for enhancing performance related to a selected file system operation of claim 41 wherein the module that canonicalizes includes:

a module that determines if the entered name string starts with a root substring;

a module that copies the current working directory to a working buffer;

a module that adds the name string to the working buffer; and a module that replaces the entered name string with the contents of the working buffer.

43. The system for enhancing performance related to a selected file system operation of claim 42 wherein the module that canonicalizes further includes a module that resolves any special characters contained in the name string.

44. The system for enhancing performance related to a selected file system operation of claim 41 wherein the module that parses the pathname includes:

a module that dissects the pathname into a plurality of substrings;

a module that searches for each substring in a string dictionary;

a module that adds a token corresponding to the substring to a list of output tokens representing the pathname; and a module that returns the list of tokens for further processing in the module that validates the parsed pathname.

45. The system for enhancing performance related to a selected file system operation of claim 44 wherein the module that parses the pathname further includes a module that creates a new token for any substring that is not found in the search of the string dictionary.

46. The system for enhancing performance related to a selected file system operation of claim 41 wherein the module that validates includes:

a module that sets the current directory to a root directory;

a module that accesses a directory table to locate the current directory;

a module that gets a token from a list of output tokens;

a module that searches the directory table for the output token; and while the list of output tokens is not empty and the table entry data indicates that the token does not correspond to a file name, a module that sets the current directory to the table entry data and causes a return to the module that accesses.

47. The system for enhancing performance related to a selected file system operation of claim 46 wherein the module that validates further includes a module that returns an invalid pathname if the token is not found in the directory table, or the list of output tokens is not empty and the table entry data indicates that the token corresponds to a file name.

48. The system for enhancing performance related to a selected file system operation of claim 46 wherein the module that validates further includes a module that returns a pathname valid indication after each token from the list of output tokens has been found in the directory table.

* * * * *